Sept. 18, 1923.  
S. B. JOHNSON  
TRACTION PLATE FOR USE WITH MOTOR VEHICLE WHEELS  
Filed March 24, 1923
1,468,023
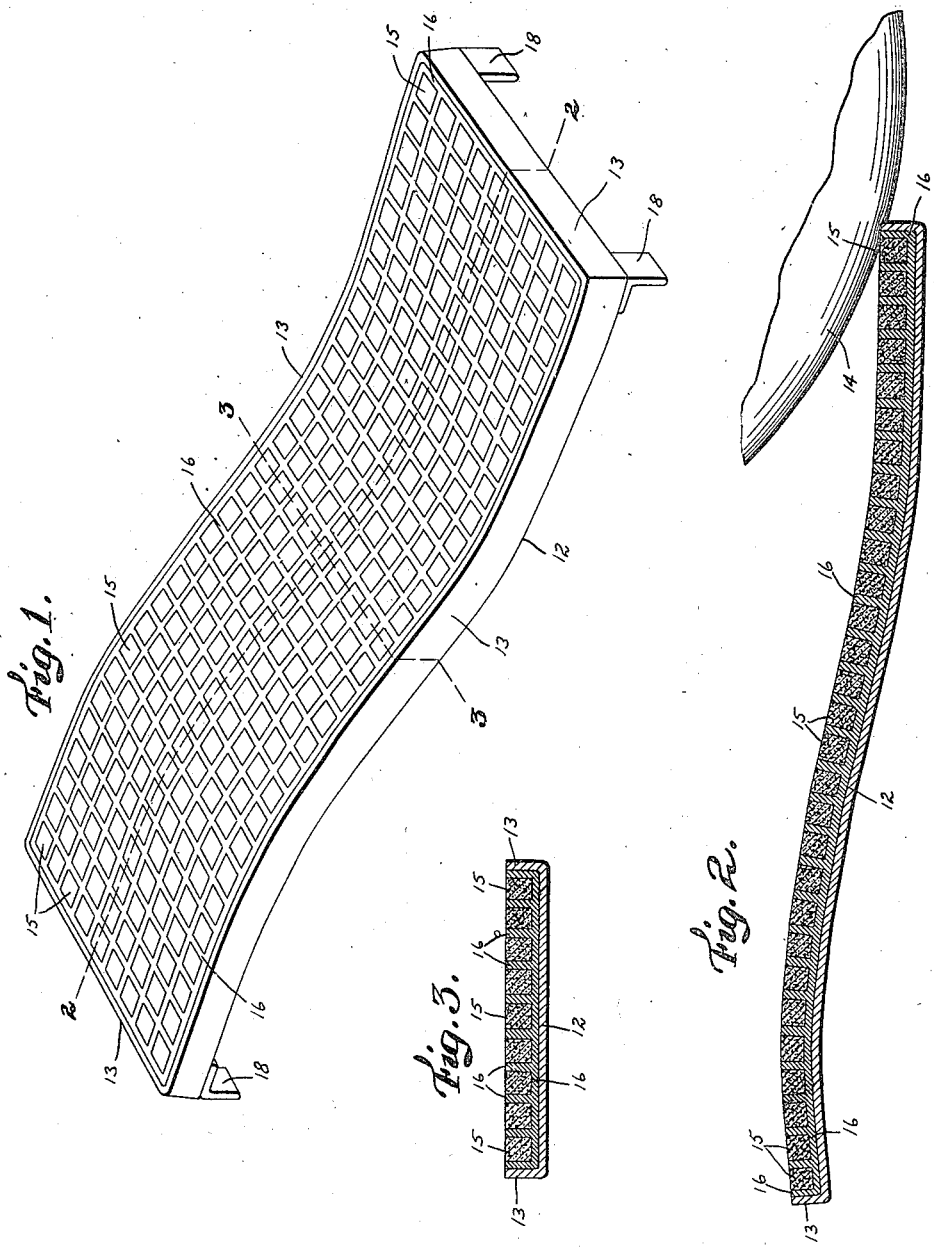
Inventor  
Sophia B. Johnson  
by Wright Brown Quinby May  
Attys.

Patented Sept. 18, 1923.

1,468,023

UNITED STATES PATENT OFFICE.

SOPHIA B. JOHNSON, OF BOSTON, MASSACHUSETTS.

TRACTION PLATE FOR USE WITH MOTOR-VEHICLE WHEELS.

Application filed March 24, 1923. Serial No. 627,491.

*To all whom it may concern:*

Be it known that I, SOPHIA B. JOHNSON, a citizen of the United States, residing at Boston, in the county of Suffolk and State of Massachusetts, have invented new and useful Improvements in Traction Plates for Use with Motor-Vehicle Wheels, of which the following is a specification.

This invention relates to means for extricating the driving-wheels of motor vehicles from ruts in mud, sand, snow, etc., and is embodied in a traction plate comprising a shallow pan composed of a bottom and a marginal curb upstanding from the bottom, and a filler occupying, and firmly secured to the pan, and presenting a frictional upper surface, substantially flush with the curb, the said plate being formed for partial insertion under the tire of a driving-wheel, and its frictional upper surface being adapted to form a track with which the tire tread may be frictionally engaged by rotation of the wheel, said surface being adapted to positively support and minimize slipping of an elastic tire tread thereon.

Of the accompanying drawings forming a part of this specification,—

Figure 1 is a perspective view of a traction plate embodying the invention.

Figure 2 is a section on line 2—2 of Figure 1.

Figure 3 is a section on line 3—3 of Figure 1.

The same reference characters indicate the same parts in all of the figures.

In the drawings, 12 represents the bottom, and 13 the marginal curb or wall of a shallow rigid pan, said bottom and curb being preferably integral with each other and composed of sheet steel, or other suitable metal, about one-eighth of an inch thick, although the thickness may be greater or less. The curb surrounds the bottom and projects upwardly therefrom.

The plate includes a filler occupying the pan and having a frictional upper surface, substantially flush with the curb, the filler being firmly secured to the pan. The filler may be of any suitable material or combination of materials, whereby its upper surface is adapted to frictionally engage an elastic tire tread and cause sufficient traction to enable the wheel having said tire to climb, when rotated, out of a rut, the plate being formed so that one of its ends may be inserted in a rut and under a portion of a tire tread 14 therein, as shown by Figure 2. Said frictional upper surface is of such nature that it positively supports and minimizes slipping of an elastic tread thereon.

I prefer to employ in the formation of the filler, cubical blocks 15, of alundum tile, a product manufactured by the Norton Company, of Worcester, Massachusetts. This material is composed in part, of granular material, such as carborundum, and has a high degree of tensile and compressive strength, toughness and adhesion to cement mortar. Its texture is such that the tire tread has an effective frictional engagement with the upper surfaces of the blocks, so that the traction is sufficient to enable the tire to roll progressively on the upper surface of the plate.

The blocks are secured to each other, and to the pan by cementitious material 16, such as the variety of cement known as asphalt mastic. This material is originally heated to render it plastic or semi-fluid, and a sufficient body of it is placed in the pan before the blocks are inserted. The blocks may be cemented to one side of a sheet of flexible cloth, the blocks being so assembled that when they are inserted in the pan, interstices are formed between their adjacent edges projecting from the sheet and between the outer edges of the outermost blocks and the curb. The cloth sheet is then placed on the pan, with the blocks projecting downward, and the blocks are pressed into the now plastic body of cement, until the cement fills the said interstices, and rises to the upper edge of the curb and the upper sides of the blocks. The thickness or height of the blocks is such that when the cloth sheet is substantially flush with the curb, the under sides of the blocks are separated from the bottom of the pan by a space which is filled with the cement. The plate is next placed in a suitable press and allowed to remain therein until the cement is solidified and adheres firmly to the blocks and to the bottom and curb of the pan. Finally the cloth sheet is stripped off, the plate being thus completed and ready for use.

I am not limited to the filler materials and construction above specified, and may employ other materials, and otherwise construct the filler to provide a frictional surface and firmly unite the material forming said surface to the pan.

The plate is preferably of oblong form, and longitudinally curved, as shown by Figures 1 and 2.

Transverse spurs 18, composed of metal angle pieces, may be welded or otherwise secured to the bottom of the pan, to prevent or minimize endwise displacement of the plate by the torque of a wheel rolling thereon.

When the cementitious material is asphalt mastic, it is sufficiently elastic to cushion the blocks 15, so that they may yield slightly to the pressure of a tire upon their upper surfaces and corners, thus minimizing liability of fracture.

I claim:

1. A traction plate comprising a shallow pan composed of a bottom and a marginal curb rising from the bottom; and a filler occupying and secured to the pan and having a rigid frictional upper surface forming a wheel track, and adapted to positively support and minimize slipping of an elastic tire tread thereon.

2. A traction plate comprising a shallow pan composed of a bottom and a marginal curb rising from the bottom; and a filler occupying and secured to the pan and having a frictional upper surface forming a wheel track, said filler being composed of rigid blocks of frictional material, separated from each other and from the curb by interstices, and cementitious material adherent to the curb and to the blocks, and occupying said interstices.

3. A traction plate comprising a shallow pan composed of a bottom and a marginal curb rising from the bottom; and a filler occupying and secured to the pan and having a frictional upper surface forming a wheel track, said filler being composed of rigid blocks of frictional material separated from each other and from the curb by interstices, and from the bottom by a space, and cementitious material adherent to the bottom, the curb, and the blocks, and occupying said interstices and space.

4. A composite traction plate comprising a rigid metallic pan and a non-metallic filler secured to the pan, and presenting a rigid frictional surface forming a wheel track, and adapted to positively support and minimize slipping of an elastic tire tread thereon.

In testimony whereof I have affixed my signature.

SOPHIA B. JOHNSON.